United States Patent
Choi et al.

(10) Patent No.: US 9,093,224 B2
(45) Date of Patent: Jul. 28, 2015

(54) ELECTRODE STRUCTURE AND METHOD FOR MANUFACTURING THE SAME, AND ENERGY STORAGE DEVICE INCLUDING THE ELECTRODE STRUCTURE

(71) Applicant: Samsung Electro-Mechanics Co., Ltd., Suwon-si, Gyeonggi-do (KR)

(72) Inventors: Jae Hoon Choi, Suwon-si (KR); Yong Suk Kim, Suwon-si (KR); Eun Sil Kim, Suwon-Si (KR); Se Woong Paeng, Suwon-si (KR); Bae Kyun Kim, Suwon-si (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 194 days.

(21) Appl. No.: 13/804,079

(22) Filed: Mar. 14, 2013

(65) Prior Publication Data
US 2014/0146439 A1    May 29, 2014

(30) Foreign Application Priority Data
Nov. 27, 2012 (KR) .................. 10-2012-0135430

(51) Int. Cl.
| | |
|---|---|
| H01G 11/34 | (2013.01) |
| H01G 11/36 | (2013.01) |
| H01G 11/42 | (2013.01) |
| H01G 13/00 | (2013.01) |
| H01G 11/28 | (2013.01) |
| H01G 11/38 | (2013.01) |
| H01G 11/86 | (2013.01) |
| H01G 11/62 | (2013.01) |

(52) U.S. Cl.
CPC .............. H01G 13/00 (2013.01); H01G 11/28 (2013.01); H01G 11/38 (2013.01); H01G 11/86 (2013.01); H01G 11/62 (2013.01); *Y02E 60/122* (2013.01); *Y02E 60/13* (2013.01)

(58) Field of Classification Search
CPC ........ H01G 11/34; H01G 11/36; H01G 11/42
USPC .................................................. 361/502–505
See application file for complete search history.

(56) References Cited

U.S. PATENT DOCUMENTS

| | | | | |
|---|---|---|---|---|
| 5,681,665 | A * | 10/1997 | Lee et al. | 429/59 |
| 6,493,210 | B2 * | 12/2002 | Nonaka et al. | 361/502 |
| 6,558,841 | B1 * | 5/2003 | Nakagiri et al. | 429/218.1 |
| 7,972,731 | B2 * | 7/2011 | Kalynushkin et al. | 429/235 |
| 2002/0093784 | A1 * | 7/2002 | Lee et al. | 361/503 |
| 2006/0127773 | A1 * | 6/2006 | Kawakami et al. | 429/245 |
| 2006/0166098 | A1 * | 7/2006 | Tabuchi et al. | 429/232 |
| 2007/0195488 | A1 * | 8/2007 | Kim et al. | 361/503 |

(Continued)

FOREIGN PATENT DOCUMENTS

| | | | | |
|---|---|---|---|---|
| JP | 2000228202 A | * | 8/2000 | H01M 4/66 |
| JP | 2006-298718 | | 11/2006 | |

(Continued)

*Primary Examiner* — Jeremy C Norris
*Assistant Examiner* — Nathan Milakovich
(74) *Attorney, Agent, or Firm* — Bracewell & Giuliani LLP; Brad Chin

(57) ABSTRACT

Disclosed herein is an electrode structure for an energy storage device, the electrode structure including a current collector and an active material layer formed on the current collector, the active material layer including a carbon material and metal particles formed on the carbon material.

14 Claims, 3 Drawing Sheets

(56) References Cited

U.S. PATENT DOCUMENTS

| | | | |
|---|---|---|---|
| 2009/0004566 A1* | 1/2009 | Shirane et al. | 429/220 |
| 2009/0023065 A1* | 1/2009 | Hwang et al. | 429/220 |
| 2011/0097512 A1* | 4/2011 | Zhou et al. | 427/545 |
| 2012/0034372 A1* | 2/2012 | Tanaka et al. | 427/115 |
| 2012/0040246 A1* | 2/2012 | Sakai et al. | 429/217 |
| 2012/0082898 A1* | 4/2012 | Takahashi et al. | 429/229 |
| 2012/0134072 A1* | 5/2012 | Bae et al. | 361/502 |
| 2012/0171468 A1* | 7/2012 | Tanaka et al. | 428/328 |
| 2012/0214375 A1* | 8/2012 | Kitano et al. | 442/336 |
| 2012/0219844 A1* | 8/2012 | Tsutsumi et al. | 429/153 |
| 2012/0256138 A1* | 10/2012 | Suh et al. | 252/503 |
| 2012/0276421 A1* | 11/2012 | Aihara et al. | 429/7 |
| 2013/0058008 A1* | 3/2013 | Kim et al. | 361/500 |
| 2013/0059205 A1* | 3/2013 | Yamamura et al. | 429/231.8 |
| 2013/0114183 A1* | 5/2013 | Lee et al. | 361/523 |
| 2013/0171502 A1* | 7/2013 | Chen et al. | 429/149 |
| 2013/0320928 A1* | 12/2013 | Yazami et al. | 320/127 |
| 2014/0042989 A1* | 2/2014 | Gogotsi et al. | 320/167 |
| 2014/0050979 A1* | 2/2014 | Woo et al. | 429/211 |
| 2014/0093773 A1* | 4/2014 | Hashimoto et al. | 429/211 |
| 2014/0113200 A1* | 4/2014 | Seymour | 429/231.8 |
| 2014/0168854 A1* | 6/2014 | Kim et al. | 361/502 |

FOREIGN PATENT DOCUMENTS

| | | |
|---|---|---|
| JP | 2007-244551 | 9/2007 |
| KR | 10-2009-0099980 | 9/2009 |
| WO | WO 2011089754 A1 * | 7/2011 |
| WO | WO 2012138152 A2 * | 10/2012 |

* cited by examiner

ELECTRODE STRUCTURE AND METHOD FOR MANUFACTURING THE SAME, AND ENERGY STORAGE DEVICE INCLUDING THE ELECTRODE STRUCTURE

CROSS REFERENCE(S) TO RELATED APPLICATIONS

This application claims the benefit under 35 U.S.C. Section 119 of Korean Patent Application Serial No. 10-2012-0135430, entitled "Electrode Structure and Method for Manufacturing the Same, and Energy Storage Device Including the Electrode Structure" filed on Nov. 27, 2012, which is hereby incorporated by reference in its entirety into this application.

BACKGROUND OF THE INVENTION

1. Technical Field

The present invention relates to an electrode structure and a method for manufacturing the same, and an energy storage device including the electrode structure, and more particularly, to an electrode structure and a method for manufacturing the same, and an energy storage device including the same, capable of realizing high output and high capacitance.

2. Description of the Related Art

Ultra capacitors or super capacitors are drawing attention as the upcoming energy storage devices due to fast charging and discharging, high stability, and ecofriendly characteristics thereof. Currently, representative super capacitors are a lithium ion capacitor (LIC), an electric double layer capacitor (EDLC), a pseudocapacitor, and a hybrid capacitor.

In the electric double layer capacitor, active carbon is used as a material for a positive electrode and a negative electrode. In the lithium ion capacitor, active carbon is used as a material for a positive electrode and a negative electrode material for a battery, such as, graphite, hydrocarbon, or the like, is used as a material for a negative electrode. In addition, there are a super capacitor in which lithium metal oxide, which is an electrode material for a battery, is used as a material for a positive electrode and active carbon is used as a material for a negative electrode, and a super capacitor in which a positive electrode and a negative electrode are composed of different metal oxide materials.

RELATED ART DOCUMENTS

Patent Document (Patent Document 1) Korean Patent Laid-Open Publication No. 10-2009-0099980

SUMMARY OF THE INVENTION

An object of the present invention is to provide an electrode structure capable of realizing high output and high capacitance, and an energy storage device including the same.

An object of the present invention is to provide a method for manufacturing an electrode structure capable of improving output and capacitance characteristics of an energy storage device.

According to an exemplary embodiment of the present invention, there is provided an electrode structure, including: a current collector; and an active material layer formed on the current collector, wherein the active material layer includes an active material having a carbon material and metal particles formed on the carbon material.

Here, a content of the metal particles may be below 40 wt % based on the active material.

The metal particles may be locally formed on the active material such that a surface of the active material is partially exposed.

The metal particles may entirely cover a surface of the active material.

The metal particles may be formed by performing a metal electroless plating process using at least any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn) on the carbon material.

According to another exemplary embodiment of the present invention, there is provided a method for manufacturing an electrode structure, the method including: preparing a current collector; performing a metal plating process on a carbon material, to prepare an active material in which metal particles are formed on the carbon material; mixing the active material, a conductive material, and a binder to prepare an active material composition; and coating the active material composition on the current collector, to form an active material layer on the current collector.

The metal plating process may be performed such that a content of the metal particles becomes below 40 wt % based on the active material.

Here, in the performing of the metal plating process, the metal particles may be locally formed on the active material such that a surface of the active material is partially exposed.

Here, in the performing of the metal plating process, the metal particles may entirely cover a surface of the active material to a uniform thickness.

Here, in the performing of the metal plating process, a metal electroless plating process using any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), and copper (Cu) may be performed on the carbon material.

According to still another exemplary embodiment of the present invention, there is provided an energy storage device, including: a negative electrode; a positive electrode facing the negative electrode; and an electrolytic liquid provided between the negative electrode and the positive electrode, wherein the negative electrode and the positive electrode each include: a current collector; and an active material layer formed on the current collector, the active material layer including an active material having a carbon material and metal particles formed on the carbon material.

Here, a content of the metal particles may be below 40 wt % based on the active material.

The metal particles may be locally formed on the active material such that a surface of the active material is partially exposed.

The metal particles may entirely cover a surface of the active material.

The metal particles may be formed by performing a metal electroless plating process using at least any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn) on the carbon material.

The electrolytic liquid may contain a lithium salt and an ammonium salt, the lithium ion including at least one of $LiPF_6$, $LiBF_4$, $LiSbF_6$, $LiAsF_5$, $LiClO_4$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$ $(CF_2)_2(SO_2)_2NLi$, and $(CF_2)_3(SO_2)_2NLi$, the ammonium salt including at least any one of tetraethyl ammonium tetrafluoroborate (TEABF4), triethylmethyl ammonium tetrafluoroborate (TEMABF4), diethyldimethyl ammonium tetrafluoroborate (DEDMABF4), diethyl-methyl-methoxyethyl ammonium tetrafluoroborate (DEMEBF4), spirobipyrrolidinium tetrafluoroborate (SBPBF4), and spiropiperidine pyrrolidinium tetrafluoroborate (SPPBF4).

The electrolytic liquid may contain a lithium salt and an ammonium salt, a concentration of the lithium salt or the ammonium salt being 0.1M to 2.0M based on the electrolytic liquid.

The electrolytic liquid may contain a lithium salt and an ammonium salt, a mole ratio of the lithium salt and the ammonium salt being 5:5 to 1:9.

The electrolytic liquid may contain a lithium salt and an ammonium salt, a mole ratio of the lithium salt and the ammonium salt being 9:1 to 1:5.

DESCRIPTION OF THE PREFERRED EMBODIMENTS

Figure 1:
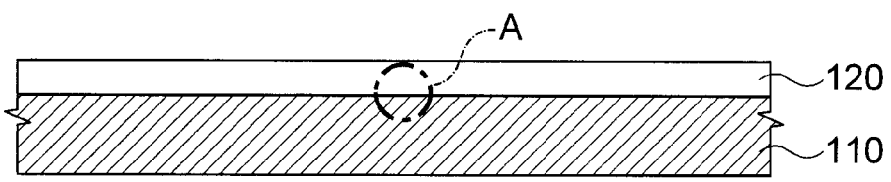
FIG. 1 is a view showing an electrode structure according to an exemplary embodiment of the present invention.

Various advantages and features of the present invention and methods accomplishing thereof will become apparent from the following description of the embodiments with reference to the accompanying drawings. However, the present invention may be modified in many different forms and it should not be limited to the exemplary embodiments set forth herein. Rather, these exemplary embodiments may be provided so that this disclosure will be thorough and complete, and will fully convey the scope of the invention to those skilled in the art. Identical reference numerals throughout the specification denote identical elements.

Terms used in the present specification are for explaining the exemplary embodiments rather than limiting the present invention. In the specification, a singular type may also be used as a plural type unless stated specifically. The word "comprise" and variations such as "comprises" or "comprising," will be understood to imply the inclusion of stated constituents, steps, operations and/or elements but not the exclusion of any other constituents, steps, operations and/or elements.

Hereinafter, an electrode structure and a method for manufacturing the same, and an energy storage device including the electrode structure, according to the present invention, will be described in detail with reference to the accompanying drawings.

Figure 2:
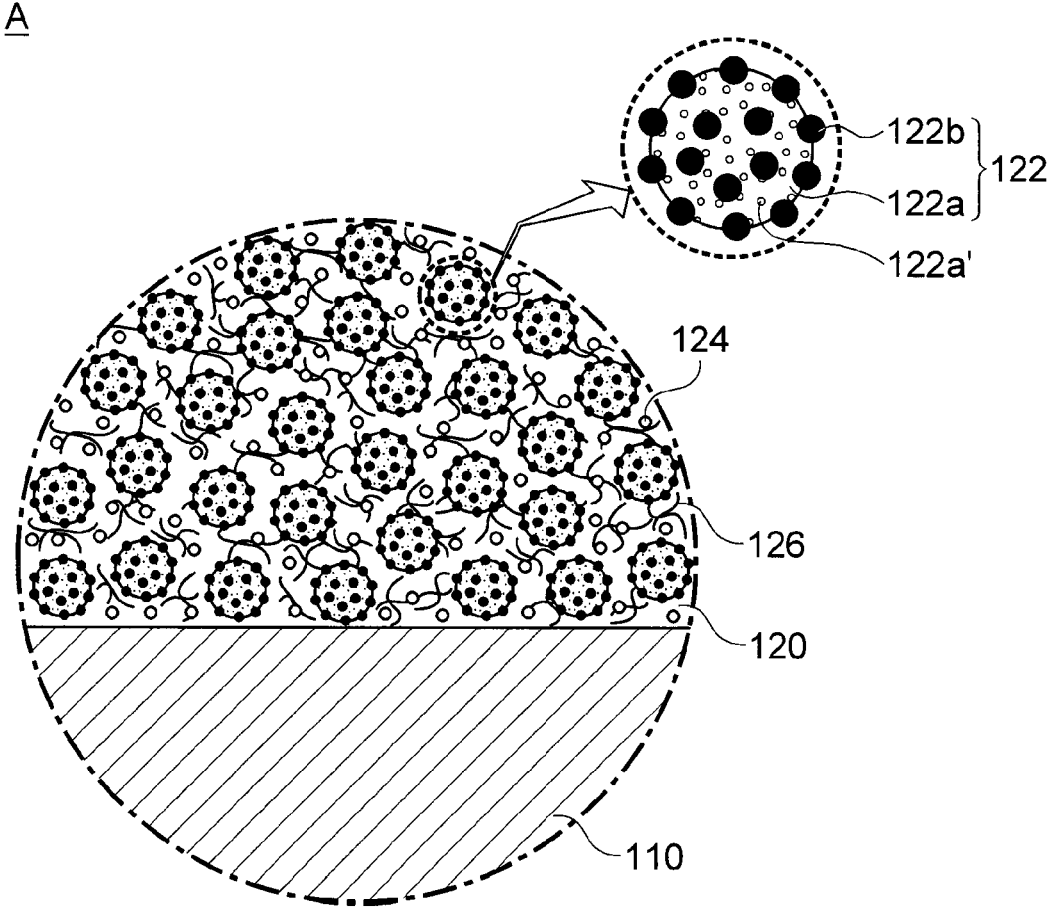
FIG. 2 is an enlarged view of Region A shown in FIG. 1.

FIG. 1 is a view showing an electrode structure according to an exemplary embodiment of the present invention; and FIG. 2 is an enlarged view of Region A shown in FIG. 1.

Referring to FIGS. 1 and 2, an electrode structure 100 according to an exemplary embodiment of the present invention may be an electrode for a predetermined energy storage device. As one example, the electrode structure 100 may be any one of a positive electrode and a negative electrode of an energy storage device called an ultra-capacitor or a super-capacitor. As another example, the electrode structure 100 may be any one of a positive electrode and a negative electrode of a lithium secondary battery.

The electrode structure 100 may have a current collector 110 and an activated material layer 120. Various kinds of metal thin plates may be used as the current collector 110. As one example, a metal foil made of at least any one material of copper and aluminum may be used as the current collector 110.

The active material layer 120 may be formed on the current collector 110. The active material layer 120 may be a film formed by preparing a predetermined active material composition in a slurry type and then coating the slurry on a surface of the metal foil. The active material layer 120 may be made of an active material 122, a conductive material 124, a binder 126, and the like.

The active material 122 may include a carbon material 122a and metal particles 122b formed on the carbon material 122a. The carbon material 122a may include at least one of activated carbon, graphite, carbon aerogel, polyacrylonitrile (PAN), carbon nano fiber (CNF), activating carbon nano fiber (ACNF), and vapor grown carbon fiber (VGCF).

The metal particles 122b may be provided in order to lower electric resistance of the active material 122, raise electric conductivity, and improve capacitance characteristics. The metal particle 122b may include at least one metal of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn), or an alloy thereof.

The conductive material 124 may be for imparting conductivity to the active material composition. A carbon based material having high electric conductivity and various kinds of metal nanoparticles may be used as the conductive material. As one example, at least one of carbon black, Ketjen black, carbon nano tube, and graphene may be used as the conductive material 124.

The binder 126 is provided in order to improve material characteristics of the slurry composition. As one example, polyvinylidene fluoride (PVDF) or a cellulose based material may be used as the binder 126.

Meanwhile, the metal particles 122b may be provided in the active material layer 120 in various types. As one example, the metal particles 122b may be irregularly or regularly distributed on a surface of the active material 122. In the case where the active material 122 is a carbon material, particularly, activated carbon, fine holes 122a' may be formed in the active material 122. These fine holes 122a' may be used as routes for allowing carrier ions to move therethrough for a charging and discharging mechanism of the energy storage device. Therefore, the metal particles 122b may be preferably provided in a manner in which they do not close the fine holes 122a'. That is, preferably, the metal particles 122b may not be provided in a film type in which they completely cover the surface of the active material 122 but may be distributed in a manner in which they locally expose the surface of the active material 122.

However, as another example, the metal particles 122b may be provided in a manner in which they completely cover the surface of the active material 122. Since the metal particles 122b are provided in a particle type, a film composed of the metal particles 122b may not interrupt movement of carrier ions even though the metal particles 122b completely cover the surface of the active material 122a. Therefore, the metal particles 122b may be provided in a manner in which they cover the entire surface of the active material 122a to a uniform thickness under the conditions in which they do not interrupt the movement of the carrier ions.

The content of the metal particles 122b may be below approximately 40 wt % based on the active material 122. The volume of the metal particles 122b may be relatively largely changed at the time of charging and discharging. Thus, if the content of the metal particles 122b is above 40 wt % based on the active material 122, cycle lifespan characteristics of the energy storage device may be deteriorated due to the change in volume. Here, if the content of the metal particles 122b is approximately 20 to 30 wt % based on the active material 122, the metal particles 122b may completely cover the surface of the active material 122 to a uniform thickness.

In addition, if the content of the metal particles 122b increases, manufacturing unit cost of the energy storage device may be high. In consideration of lifespan characteristics of the energy storage device and a reduction in manufacturing unit cost, the content of the metal particles 122b may be preferably below approximately 20 wt % based on the active material 122. Whereas, if the content of the metal particles 122b is extremely low, this may not sufficiently work in reducing electric resistance of the active material 120 itself, raising electric conductivity, and increasing capacitance, which are to be solved by the present invention. Therefore, the content of the metal particles 122b may be preferably provided approximately 1 wt % or more based on the active material 122

In addition, the metal particles 122b may be provided in a manner in which they lower electric resistance of the active material 122 itself and raise electric conductivity. More specifically, in order to raise electric conductivity of the active material layer 120, there may be a method of increasing the content of the conductive material 124. However, when the content of the conductive material 124 is increased, the content of the active material 122 is decreased in the active material layer 120, thereby reducing storage capacitance of the energy storage device. Therefore, in view of resistance and capacitance characteristics of the energy storage device, the method of lowering electric resistance of the active material 122 itself and raising electric conductivity may be preferable. For achieving this, in order to realize a configuration in which the metal particles 122b are directly formed and distributed on the carbon material 122a, a predetermined plating process may be carried out directly on the carbon material 122a used for the active material 122. A method of preparing this active material 122 will be later described in detail.

In succession, a method for manufacturing the foregoing electrode structure according to the exemplary embodiment of the present invention will be described in detail. Here, overlapping descriptions of the foregoing electrode structure 100 may be omitted or simplified.

Figure 3:
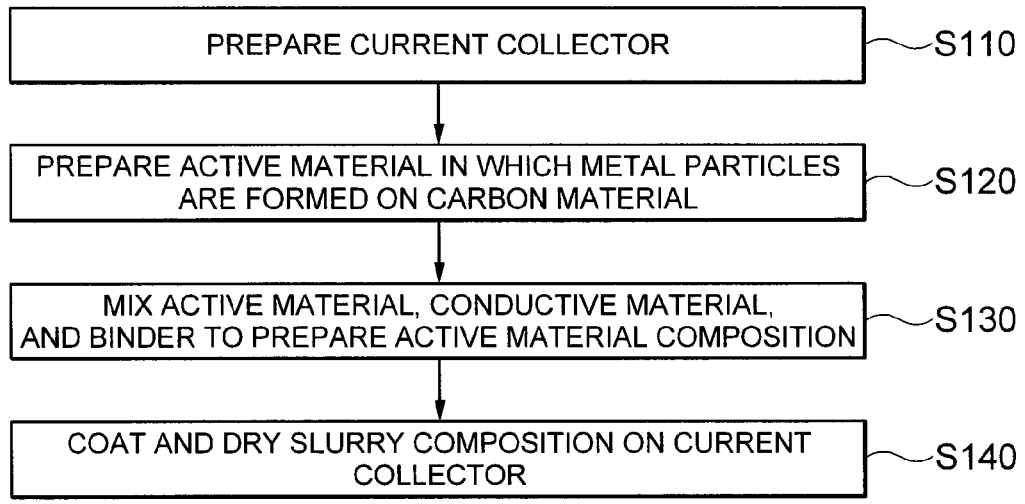
FIG. 3 is a flow chart showing a method for manufacturing the electrode structure according to the exemplary embodiment of the present invention.

FIG. 3 is a flow chart showing a method for manufacturing the electrode structure according to the exemplary embodiment of the present invention. Referring to FIGS. 1 to 3, a current collector 110 may be prepared (S110). The preparing step of the current collector 110 may include preparing any one of an aluminum foil and a copper foil.

An active material 120 in which metal particles 122b are formed on a carbon material 122a may be prepared (S120). The preparing step of the active material 120 may include: preparing at least one carbon material of activated carbon, graphite, carbon aerogel, polyacrylonitrile (PAN), carbon nano fiber (CNF), activating carbon nano fiber (ACNF), and vapor grown carbon fiber (VGCF); and performing a plating process on the carbon material 122a. In the performing step of the plating process, a metal electroless plating process using at least one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn) may be performed on the carbon material.

An active material composition may be formed by mixing a conductive material 124 and a binder 126 to the active material 122 (S130). At least one of carbon black, ketjen black, carbon nanotube, and graphene is used as the conductive material 124. A cellulose based material, such as, polyvinylidene fluoride (PVDF), styrene butadiene rubber (SBR), or carboxy methyl cellulose may be used as the binder 126. Here, since the metal particles 122b have relatively higher electric conductivity than the conductive material 124, the electric conductivity of the active material 122 may be raised even though the content of the conductive material 124 is relatively reduced. Therefore, the content of the conductive material 124 is controlled, considering of the content of the metal particles 122b. Here, the content of the conductive material 124 may be relatively reduced in comparison with a case in which the metal particles 122b are not used, and further, the conductive material 124 may not be used.

The active material composition may be coated and dried on the current collector 110 (S140). The active material composition may be prepared in a slurry type, and the slurry may be coated on the current collector 110. In addition, the slurry may be dried by heat treatment at a predetermined temperature. Therefore, an active material layer 120 is formed on the current collector 110, and thus an electrode structure 100 may be manufactured.

As described above, the electrode structure 100 according to the embodiment of the present invention may include the current collector 110 and the active material layer 120 formed on the current collector 110. The active material layer 120 may be realized by an active material 122 composed of a carbon material 122a on which the metal particles 122b are formed. In this case, electric resistance of the active material 122 itself may be lowered and electric conductivity may be improved by the metal particles 122b, and thus storage capacitance of an energy storage device 200 including the same may be significantly improved. Therefore, in the electrode structure according to the present invention, a plating process is performed on the carbon material used for an active material to thereby form metal particles on the carbon material, thereby lowering electric resistance of the active material itself and raising electric conductivity, and thus improving output and capacitance characteristics of the energy storage device.

In addition, in the method for manufacturing the electrode structure according to the embodiment of the present invention, the plating process is performed on the carbon material 122a to prepare the active material 120 in which the metal particles 122b are formed on the carbon material 122a; the active material 120 is mixed with the conductive material 124 and the binder 126 to prepare an active material composition; and then the active material composition is coated and dried on the current collector 110, thereby manufacturing the electrode structure 100. The thus manufactured electrode structure 100 can lower electric resistance of the active material 122 itself and improve electric conductivity by the metal particles 122b. Therefore, in the method for manufacturing the electrode structure according to the present invention, the plating process is performed on the carbon material used for an active material, to form metal particles thereon, to prepare the active material composition, so that electric resistance of the active material composition itself is lowered and electric conductivity is raised, thereby manufacturing an electrode structure capable of improving storage capacitance and electric conductivity of the energy storage device can be manufactured.

Hereafter, energy storage devices according to exemplary embodiments of the present invention will be described in detail. Here, overlapping contents of the electrode structure 100 described with reference to FIGS. 1 and 2 may be omitted or simplified.

Figure 4:
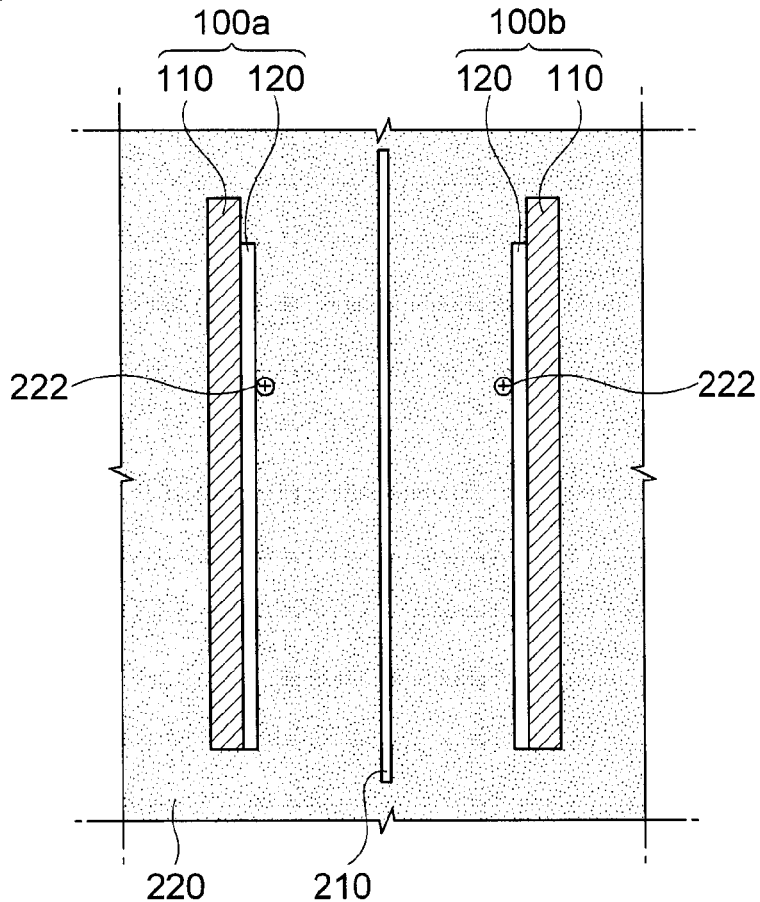
FIG. 4 is a view showing an energy storage device according to an exemplary embodiment of the present invention.

FIG. 4 is a view showing an energy storage device according to an exemplary embodiment of the present invention. Referring to FIGS. 1, 2, and 4, an energy storage device 200 according to an exemplary embodiment of the present invention may include electrode structures 100a and 100b, a separator 210, and an electrolytic liquid 220.

The electrode structures 100a and 100b may have the same structure as the foregoing electrode structure 100 described with reference to FIGS. 1 and 2. The electrode structures 100a and 100b may be disposed to face each other with the separator 210 therebetween. Between the electrode structures 100a and 100b, the electrode structure 100a disposed at one side of the separator 210 may be used as an negative electrode of the energy storage device 200, and the electrode structure 100b disposed at the other side of the separator 210 may be used as a positive electrode of the energy storage device 200.

The negative electrode 100a and the positive electrode 100b each may include a current collector 110 and an active material layer 120 coated on the current collector 110. Here, the current collector 110 may include an aluminum (Al) foil, and the active material layer 120 may include activated carbon as an active material. In addition, the active material layer 120, as described with reference to FIGS. 1 and 2, may be composed of the active material 122a, metal particles 122b formed by performing a plating process on the active material 122a, a conductive material 124, a binder 126, and the like.

The separator 210 may be disposed between the electrode structures 100a and 100b. The separator 210 may electrically separate the negative electrode 100a and the positive electrode 100b from each other. At least one of non-woven fabric, polytetrafluoroethylene (PTFE), a porous film, Kraft paper, cellulose based electrolytic paper, a rayon fiber, and a variety of other kinds of sheets may be used as the separator 210.

The electrolytic liquid 220 may be a composition prepared by dissolving an electrolyte in a predetermined solvent. The electrolyte may contain positive ions 222 having a charging and discharging reaction mechanism in which they are adsorbed on or desorbed from a surface of the active material layer 120 of the negative electrode 100a. A non-lithium based electrolyte salt may be used as such an electrolytic salt. The non-lithium based electrolyte salt may be a salt containing non-lithium ions used as carrier ions between the negative electrode 100a and the positive electrode 100b at the time of charging and discharging the energy storage device 200. For example, the non-lithium based electrolyte sale may contain an ammonium based positive ion ($NR_4^+$). More specifically, the non-lithium based electrolyte salt (hereafter, "ammonium salt") may include at least one of tetraethyl ammonium tetrafluoroborate (TEABF4), triethylmethyl ammonium tetrafluoroborate (TEMABF4), diethyldimethyl ammonium tetrafluoroborate (DEDMABF4), and diethyl-methylmethoxyethyl ammonium tetrafluoroborate (DEMEBF4). Alternatively, the non-lithium based electrolyte salt may include spirobipyrrolidinium tetrafluoroborate (SBPBF4), spiropiperidine pyrrolidinium tetrafluoroborate (SPPBF4), and the like.

Alternatively, the electrolyte may further include a lithium based electrolyte salt (hereinafter, 'lithium salt'). The lithium salt may be a salt containing a lithium ion ($Li^+$), as a carrier ion between the negative electrode 110a and the positive electrode 100b at the time of charging and discharging the energy storage device 200. The lithium ion salt may include at least one of $LiPF_6$, $LiBF_4$, $LiSbF_6$, $LiAsF_5$, $LiClO_4$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3$ (iso-$C_3F_7)_3$, $LiPF_5$(iso-$C_3F_7$), $(CF_2)_2(SO_2)_2NLi$, and $(CF_2)_3(SO_2)_2NLi$.

As described above, as the electrolyte salt, at least one of the ammonium salt and the lithium salt may be used alone, or two salts may be used by mixture. In the case where the ammonium salt and the lithium salt are used by mixture, the lithium salt and the non-lithium salt are mixed at approximately similar mole concentrations, and a relative content ratio between the lithium salt and the non-lithium salt may be controlled depending on the kind and applied field of the energy storage device 200. For example, in the case in which the energy storage device 200 is used in a field in which output characteristics are emphasized, the weight ratio (wt %) of the ammonium salt may be preferably equal to or increased in comparison with the weight ratio (wt %) of the lithium salt. As an example, the mole concentrations of the lithium salt and the ammonium salt in the electrolytic liquid 220 each may be controlled to 0.3 mol/L to 1.5 mol/L, and the weight ratio (wt %) of the lithium salt and the weight ratio (wt %) of the ammonium salt may be controlled to approximately 5:5 to 1:9. As another example, in the case where the energy storage device 200 is used in a field in which capacitance characteristics of the energy storage device 200 are emphasized, the weight ratio (wt %) of the lithium salt and the weight ratio (wt %) of the ammonium salt may be controlled to approximately 9:1 to 5:5.

In the case where the content of the lithium salt in the electrolytic liquid 220 is less than the ratio standard, the capacitance of the energy storage device 200 can be reduced. Particularly, in the case where the energy storage device 200 is a lithium ion capacitor (LIC), lithium ions are consumed due to initial SEI film formation at the time of initial charging and discharging, and thus irreversible capacitance of the electrode may be increased and solution stability of the energy storage device 200 may be lowered. Whereas, in the case where the content of the lithium salt in the electrolytic liquid 220 is more than the ratio standard, charging and discharging characteristics of the energy storage device 200 may be deteriorated due to hydrolysis of the lithium salt. In addition, since ion conductivity of the electrolytic liquid is smaller in a case of using a lithium salt than in a case of using an ammonium salt, generally, output characteristics of the energy storage device may be deteriorated.

Here, the concentration of the electrolyte salt containing the ammonium salt and the lithium salt may be preferably below 2.0M. The output and capacitance characteristics of the energy storage device 200 increases as the concentration of the electrolytic liquid increases, but if the concentration of the electrolytic liquid is above 2.0M, an increase in solubility and conductivity of the electrolyte salt is rather saturated, and thus characteristics of the energy storage device may be deteriorated. In addition, excessive use of the electrolyte salt may cause an increase in manufacturing unit cost of the energy storage device. Meanwhile, if the concentration of the electrolyte salt is remarkably small, output and capacitance characteristics of the energy storage device 200 are not sufficiently exhibited. Therefore, the concentration of the electrolyte salt may be preferably 0.1M or more. Therefore, the concentration of the electrolyte salt may be controlled to approximately 0.1M to 2.0M.

The solvent may include at least one of cyclic carbonate and linear carbonate. For example, as the cyclic carbonate, at least any one of ethylene carbonate (EC), propylene carbonate (PC), butylene carbonate (BC), and vinyl ethylene carbonate (VEC) may be used. As the linear carbonate, at least any one of dimethyl carbonate (DMC), methyl ethyl carbonate (EMC), diethyl carbonate (DEC), methyl propyl carbonate (MPC), dipropyl carbonate (DPC), methylbutyl carbonate (MBC), and dibutyl carbonate (DBC) may be used. Besides, various kinds of ethers, esters, and amide based solvents, such as, acetonitrile, propionitrile, gamma butyrolactone, sulfolane, ethyl acetate, methyl acetate, methyl propionate, and the like, may be used.

The energy storage device 200 having the foregoing structure may include a negative electrode 100a and a positive electrode 100b each having a current collector 110 and an active material layer 120 formed on the current collector 110, the active material layer 120 having metal particles 122b formed by performing a plating process on the carbon material 122a. An aluminum foil may be used as the current collector 110, and the active material layer 120 may contain activated carbon 122. The energy storage device 200 having the above structure may be used as an electric double layer capacitor (EDLC) driven by using, as a charging and discharging reaction mechanism, electric double layer charging through the activated carbon.

Figure 5:
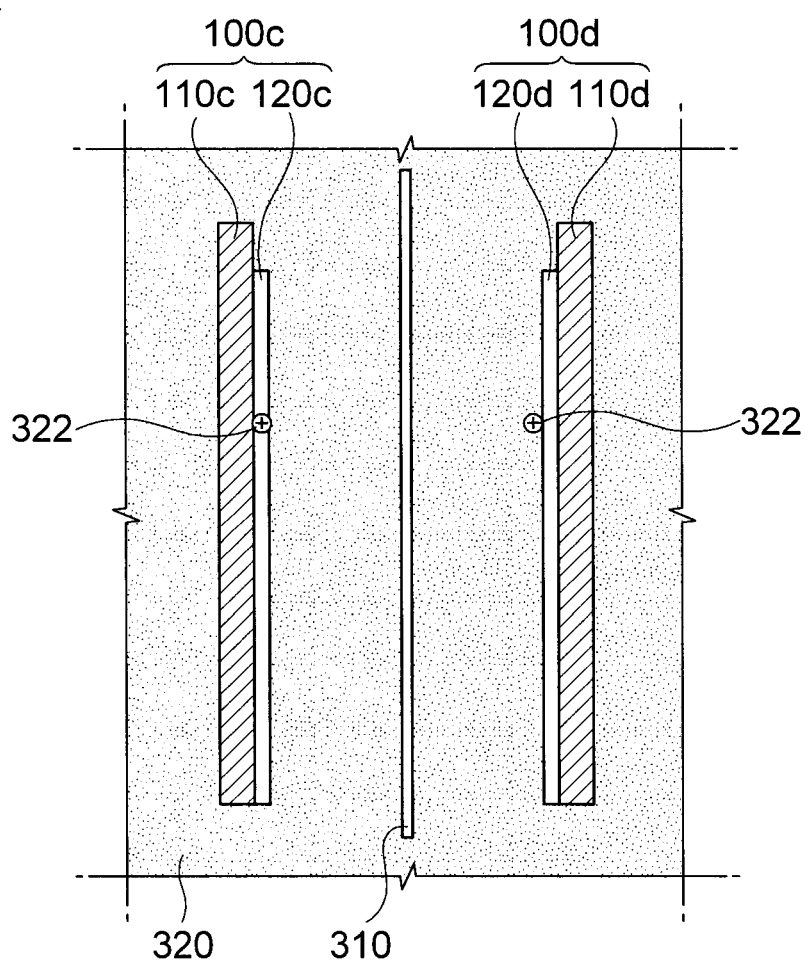
FIG. 5 is a view showing an energy storage device according to another exemplary embodiment of the present invention.

FIG. 5 is a view showing an energy storage device according to another exemplary embodiment of the present invention. Referring to FIGS. 1, 2, and 4, an energy storage device 300 according to another exemplary embodiment of the present invention may include electrode structures 100c and 100d, a separator 310, and an electrolytic liquid 320.

The electrode structures 100c and 100d each may have substantially the same structure as the electrode structure 100 described with reference to FIGS. 1 and 2, and may be disposed to face each other with the separator 310 therebetween. Any one of the electrode structures 100c and 100d may be used as a negative electrode 100c of the energy storage device 300, and the other of the electrode structures 100c and 100d may be used as a positive electrode 100d of the energy storage device 300.

The negative electrode 100c and the positive electrode 100d may be composed of different kinds of current collectors and active material layers coated on the current collectors, respectively. For example, the negative electrode 100c may be composed of a current collector 110c including a copper foil and an active material layer 120c including graphite. Whereas, the positive electrode 100d may be composed of a current collector 110d including an aluminum foil and an active material layer 120d including activated carbon.

The electrolytic liquid 320 may be a composition prepared by dissolving a predetermined electrolyte salt in a solvent. The electrolyte salt may contain positive ions 322 having a charging reaction mechanism in which they are absorbed inside the active material layer 120c of the negative electrode 100c. In addition, the positive ions 322 may behave so as to have a charging reaction mechanism in which they are absorbed on a surface of the active material layer 120d of the positive electrode 100d. As the above electrolyte salt, a lithium salt may be used alone. Alternatively, as the electrolyte salt, a lithium salt and an ammonium salt may be used by being mixed at a predetermined ratio. The content of the electrolyte salt may be controlled such that the concentration of the electrolytic liquid is approximately 0.1M to 2.0M. As the solvent, cyclic carbonate, linear carbonate, various kinds of ethers, esters, and amide based solvents may be selectively used.

The energy storage device 300 having the above structure may include the negative electrode 100c composed of the current collector 110c including a copper foil and the active material layer 120c including graphite, the positive electrode 100d composed of the current collector 110d including an aluminum foil and the active material layer 120d including activated carbon, and the electrolytic liquid 320 having the lithium salt. The energy storage device 300 having the above structure may be used a lithium ion capacitor (LIC) using a lithium ion O(Li$^+$) as a carrier ion of an electrochemical reaction mechanism.

Example 1

An activated carbon powder was prepared, and a silver (Ag) electroless plating process was performed on the activated carbon powder. As a plating solution used at the time of the silver electroless plating process, a plating solution in which silver nitrate (AgNO3) 9.7 g, ammonium hydroxide 4.4 g, hydrazine sulfate 19.2 g, and sodium hydroxide (NaOH) 4.8 g are dissolved may be used. The electroless plating process was performed by allowing the activated carbon powder 62 g to react with the plating solution. In addition, washing, filtering, and vacuum drying processes, and the like were sequentially performed to obtain an active material. The thus obtained active material was mixed with an acetylene black (AB) conductive material and a polyvinylidene fluoride (PVDF) binder at a ratio of, approximately, 80:10:10, to prepare a slurry type active material composition, and the active material composition was coated and dried on a metal foil, to manufacture a negative electrode. Meanwhile, a positive electrode was manufactured by mostly the same method as the foregoing negative electrode, while using an activated carbon powder not subjected to electroless plating.

An electrolytic liquid was prepared by preparing 1M TEABF4 as an ammonium salt and 0.5M LiBF4 as a lithium salt, and then dissolving these electrolytes in an acetonitrile (ACN) solvent. The foregoing electrode structures were cut to a size of 5 cm×10 cm, and then stacked, and then the electrolytic liquid is injected thereinto, to manufacture a pouch type electric double layer capacitor (EDLC). Capacitance and resistance characteristics of the thus manufactured electric double layer capacitor were evaluated at a voltage range of, approximately, 0.1V to 2.7V.

Example 2

An electric double layer capacitor was manufactured under the same conditions except that a tin (Sn) electroless plating process was performed for the plating process, in comparison with Example 1, and then tests were conducted with the same conditions. As a plating solution used in the tin electroless plating process, a plating solution in which stannous chloride (SnCl2.2H2O) 4.9 g, sodium hydroxide (NaOH) 5.2 g, and sodium cyanide (NaCN) 50 g were dissolved was used.

Comparative Example 1

An electric double layer capacitor was manufactured by not performing an electroless plating process on a positive electrode and a negative electrode and using only activated carbon as an active material, and allowing the other conditions to be the same, in comparison with Examples 1 and 2, and then tests were conducted with the same conditions.

Example 3

A graphite powder was prepared, and a silver (Ag) electroless plating process was performed on the graphite powder. As a plating solution used at the time of the silver electroless plating process, a plating solution in which silver nitrate (AgNO3) 9.7 g, ammonium hydroxide 4.4 g, hydrazine sulfate 19.2 g, and sodium hydroxide (NaOH) 4.8 g are dissolved may be used. The other conditions were allowed to be the same as the conditions for the electroless plating process of Example 1.

In addition, washing, filtering, and vacuum drying processes, and the like were sequentially performed to obtain an active material. The thus obtained active material was mixed with an acetylene black (AB) conductive material and a polyvinylidene fluoride (PVDF) binder at a ratio of, approximately, 80:10:10, to prepare a slurry type active material composition, and the active material composition was coated and dried on a metal foil, to manufacture a negative electrode. Meanwhile, a positive electrode was manufactured by mostly the same method as the foregoing negative electrode, while using an activated carbon powder not subjected to electroless plating. An electrolytic liquid was prepared by preparing 0.5M TEABF4 as an ammonium salt and 1.0M LiPF6 as a lithium salt, and using, as a solvent for these electrolytes, ethylene carbonate (EC), propylene carbonate (PC), or ethylmethyl carbonate (EMC).

The thus manufactured electrode structures were cut to a size of 5 cm×10 cm, and then stacked, and then the electrolytic liquid is injected thereinto, to manufacture a pouch type lithium ion capacitor (LIC). Capacitance and resistance characteristics of the thus manufactured lithium ion capacitor were evaluated at a voltage range of, approximately, 2.2V to 3.8V.

Example 4

A lithium ion capacitor was manufactured under the same conditions, except that a tin (Sn) electroless plating process was performed for the plating process, in comparison with Example 3, and then tests were conducted with the same conditions. As a plating solution used in the tin electroless plating process, a plating solution in which stannous chloride (SnCl2.2H2O) 4.9 g, sodium hydroxide (NaOH) 5.2 g, and sodium cyanide (NaCN) 50 g were dissolved was used.

Comparative Example 2

A lithium ion capacitor was manufactured by not performing an electroless plating process on a positive electrode and a negative electrode and using only graphite as an active material, and allowing the other conditions to be the same, in comparison with Examples 3 and 4, and then tests were conducted with the same conditions.

The foregoing Examples 1 to 4 and Comparative Examples 1 and 2 were schematically summarized in Table 1 below, and test results were summarized in Table 2 below.

TABLE 1

| Classificatino | | Negative electrode active material | Positive electrode active material |
|---|---|---|---|
| EDLC | Example 1 | Activated carbon + Silver Powder | Activated carbon |
| | Example 2 | Activated carbon + Tin Powder | Activated carbon |
| | Comparative Example 1 | Activated carbon | Activated carbon |
| LIC | Example 3 | Graphite + Silver Powder | Activated carbon |
| | Example 4 | Graphite + Tin Powder | Activated carbon |
| | Comparative Example 2 | Graphite | Activated carbon |

TABLE 2

| Classification | | Capacitance (F) | AC Resistance (mΩ) |
|---|---|---|---|
| EDLC | Example 1 | 283 | 3.2 |
| | Example 2 | 286 | 3.3 |
| | Comparative Example 1 | 249 | 3.8 |
| LIC | Example 3 | 564 | 4.8 |
| | Example 4 | 570 | 4.9 |
| | Comparative Example 2 | 496 | 5.7 |

As described above, it was confirmed that the electric double layer capacitors, corresponding to the energy storage device 200 according to an exemplary embodiment of the present invention, had high capacitance of 280 F or higher and a low AC resistance of lower than 3.5 mΩ at a test voltage range of approximately 0.1 to 2.7V. This showed that the capacitance was improved by approximately 15% and the electric resistance was reduced by 16% or more, in comparison with the electric double layer capacitor according to Comparative Example 1, in which the carbon material was not subjected to plating, having a capacitance of 249 F and AC resistance of 3.8 mΩ.

In addition, it was confirmed that the lithium ion capacitors, corresponding to the energy storage device 300 according to another exemplary embodiment of the present invention, had high capacitance of 560 F or higher and a low AC resistance of lower than 5.0 mΩ at a test voltage range of approximately 2.2 to 3.8V. This showed that the capacitance was improved by approximately 15% and the electric resistance was reduced by 16% or more, in comparison with the lithium ion capacitor according to Comparative Example 2, in which the carbon material was not subjected to plating, having a capacitance of 496 F and AC resistance of 5.7 mΩ.

As set forth above, according to the electrode structure and the energy storage device including the same of the present invention, a plating process is performed on a carbon material used for an active material to form metal particles, thereby lowering electric resistance of the active material itself and raising electric conductivity, and thus storage capacitance and electric conductivity of the energy storage device can be improved.

According to the method for manufacturing the electrode structure, the active material composition was prepared by performing a plating process on a carbon material used for an active material to form metal particles, thereby lowering electric resistance of the active material composition itself and raising electric conductivity, and thus there can be manufactured an electrode structure capable of improving storage capacitance and electric conductivity of the energy storage device.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. An electrode structure, comprising:
a current collector; and
an active material layer formed on the current collector,
wherein the active material layer includes an active material having a carbon material and metal particles locally formed on the carbon material such that a surface of the active material is partially exposed.

2. The electrode structure according to claim 1, wherein a content of the metal particles is below 40 wt % based on the active material.

3. The electrode structure according to claim 1, wherein the metal particles are formed by performing a metal electroless plating process using at least any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn) on the carbon material.

4. A method for manufacturing an electrode structure, the method comprising:
preparing a current collector;
performing a metal plating process on a carbon material, to prepare an active material in which metal particles are locally formed on the carbon material such that a surface of the active material is partial exposed;
mixing the active material, a conductive material, and a binder to prepare an active material composition; and
coating the active material composition on the current collector, to form an active material layer on the current collector.

5. The method according to claim 4, wherein the metal plating process is performed such that a content of the metal particles becomes below Owl % based on the active material.

6. The method according to claim 4, wherein in the performing of the metal plating process, the metal particles entirely cover a surface of the active material to a uniform thickness.

7. The method according to claim 4, wherein in the performing of the metal plating process, a metal electroless plating process using any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), and copper (Cu) is performed on the carbon material.

8. An energy storage device, comprising:
a negative electrode;
a positive electrode facing the negative electrode; and
an electrolytic liquid provided between the negative electrode and the positive electrode, wherein the negative electrode and the positive electrode each include:
a current collector; and
an active material layer formed on the current collector, the active material layer including an active material having a carbon material and metal particles locally formed on the carbon material such that a surface of the active material is partially exposed.

9. The energy storage device according to claim 8, wherein a content of the metal particles is below 40 wt % based on the active material.

10. The energy storage device claim 8, wherein the metal particles are formed by performing a metal electroless plating process using at least any one of tin (Sn), silver (Ag), gold (Au), palladium (Pd), platinum (Pt), antimony (Sb), bismuth (Bi), rhodium (Rh), nickel (Ni), cobalt (Co), zinc (Zn), ruthenium (Ru), copper (Cu), silicon (Si), chrome (Cr), and manganese (Mn) on the carbon material.

11. The energy storage device claim 8, wherein the electrolytic liquid contains a lithium salt and an ammonium salt, the lithium ion including at least one of $LiPF_6$, $LiBF_4$, $LiSbF_6$, $LiAsF_5$, $LiClO_4$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, $(CF_2)_2(SO_2)_2NLi$, and $(CF_2)_3(SO_2)_7NLi$, the ammonium salt including at least any one of tetraethyl ammonium tetrafluoroborate (TEABF4), triethylmethyl ammonium tetrafluoroborate (TEMABF4), diethyldimethyl ammonium tetrafluoroborate (DEDMABF4), diethyl-methyl-methoxyethyl ammonium tetrafluoroborate (DEMEBF4), spirobipyrrolidinium tetrafluoroborate (SBPBF4), and spiropiperidine pyrrolidinium tetrafluoroborate (SPPBF4).

12. The energy storage device according to claim 8, wherein the electrolytic liquid contains a lithium salt and an ammonium salt, a concentration of the lithium salt or the ammonium salt being 0.1M to 2.0M based on the electrolytic liquid.

13. The energy storage device according to claim 8, wherein the electrolytic liquid contains a lithium salt and an ammonium salt, a mole ratio of the lithium salt and the ammonium salt being 5:5 to 1:9.

14. The energy storage device according to claim 8, wherein the electrolytic liquid contains a lithium salt and an ammonium salt, a mole ratio of the lithium salt and the ammonium salt being 9:1 to 1:5.

* * * * *